(12) United States Patent
Ostrovsky et al.

(10) Patent No.: US 8,291,237 B2
(45) Date of Patent: Oct. 16, 2012

(54) METHOD FOR PRIVATE KEYWORD SEARCH ON STREAMING DATA

(75) Inventors: Rafail Ostrovsky, Los Angeles, CA (US); William E. Skeith, III, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 1106 days.

(21) Appl. No.: 11/816,849

(22) PCT Filed: Feb. 28, 2006

(86) PCT No.: PCT/US2006/007184
§ 371 (c)(1),
(2), (4) Date: Aug. 6, 2008

(87) PCT Pub. No.: WO2006/094017
PCT Pub. Date: Sep. 8, 2006

(65) Prior Publication Data
US 2008/0294909 A1  Nov. 27, 2008

Related U.S. Application Data

(60) Provisional application No. 60/657,602, filed on Mar. 1, 205.

(51) Int. Cl.
*G06F 11/30* (2006.01)

(52) U.S. Cl. ........ 713/189; 713/168; 713/171; 713/176; 713/182; 709/201; 707/705; 707/728

(58) Field of Classification Search .................. 713/168, 713/171, 176, 182, 189; 707/705, 728; 709/201, 709/999.002, 999.003, 999.006
See application file for complete search history.

(56) References Cited

U.S. PATENT DOCUMENTS

| | | | |
|---|---|---|---|
| 6,167,392 A * | 12/2000 | Ostrovsky et al. ................ 1/1 |
| 6,603,875 B1 | 8/2003 | Matsuyama et al. | |
| 6,813,358 B1 | 11/2004 | Di Crescenzo et al. | |
| 7,117,199 B2 * | 10/2006 | Frank et al. ........................ 1/1 |
| 2002/0129245 A1 * | 9/2002 | Cassagnol et al. ............ 713/168 |
| 2005/0138110 A1 * | 6/2005 | Redlich et al. ................ 709/201 |
| 2007/0005594 A1 * | 1/2007 | Pinkas et al. ...................... 707/6 |
| 2009/0210697 A1 * | 8/2009 | Chen et al. .................... 713/153 |
| 2010/0146299 A1 * | 6/2010 | Swaminathan et al. ....... 713/189 |

OTHER PUBLICATIONS

Jin Wook Byun; Dong Hoon Lee, On a security model of conjunctive keyword search over encrypted relational database, Aug. 2011, Publisher: Elsevier Science Inc., Journal of Systems and Software , vol. 84 , No. 8 , pp. 1364-1372.*

Koletka, R.; Hutchison, A., An architecture for secure searchable cloud storage, 2011, Publisher: IEEE, Piscataway, NJ, 7 pp.*

(Continued)

*Primary Examiner* — Taghi Arani
*Assistant Examiner* — Amir Mehrmanesh
(74) *Attorney, Agent, or Firm* — Vista IP Law Group LLP

(57) ABSTRACT

A method for private keyword searching on streaming data such that the searching does not reveal what keywords are being searched for and does not reveal whether any such keywords have been located nor which documents in the data stream are saved.

19 Claims, 4 Drawing Sheets

OTHER PUBLICATIONS

Bo Zhang; Fangguo Zhang, An efficient public key encryption with conjunctive-subset keywords search, Jan. 2011, Publisher: Academic Press Journal of Network and Computer Applications, vol. 34, No. 1, pp. 262-267.*

Ran Canetti,Susan Hohenbergery, "Chosen-Ciphertext Secure Proxy Re-Encryption"CCS '07 Proceedings of the 14th ACM conference on Computer and communications security pp. 185-194.*

PCT International Search Report for PCT/US06/07184, Applicant: The Regents of the University of California, Form PCT/ISA/210 and 220, dated Oct. 22, 2007 (4 pages).

PCT Written Opinion of the International Searching Authority for PCT/US06/07184, Applicant: The Regents of the University of California, Form PCT/ISA/237, dated Oct. 22, 2007 (4 pages).

Chor, B., et al., "Private Information Retrieval by Keywords", Computer Science Dept., Technion, Haifa, Israel (1998).

Ogata, W., et al., "Oblivious Keyword Search", Journal of Complexity 20, pp. 356-371 (2004).

Freedman, M.J., et al., "Keyword Search and Oblivious Pseudorandom Functions", J. Kilian (Ed.): TCC 2005, LNCS 3378, pp. 303-324 (2005).

Ostrovsky, R., et al., "Private Searching on Streaming Data", Cryptology ePrint Archive: Report 2005/242 (36 pages) (Nov. 2006).

* cited by examiner

```
001  010  001  010  010  100  010  100  100  001  010... ⎫ 305a
010  001  010  100  100  010  100  001  010  100  010... ⎫ 305b
100  010  100  010  100  100  010  001  100  010  010... ⎫ 305c
------------------------------------------------------------
111  001  111  100  010  010  100  100  010  111  010... ⎫ 310
```

METHOD FOR PRIVATE KEYWORD SEARCH ON STREAMING DATA

REFERENCE TO RELATED APPLICATIONS

This Application is a U.S. National Stage filing under 35 U.S.C. §371 of International Application No. PCT/US2006/007184, filed Feb. 28 2006, which claims priority to U.S. Provisional Patent Application No. 60/657,602 filed on Mar. 1, 2005. The contents of the aforementioned applications are hereby incorporated herein by reference in their entirely. Priority to the aforementioned applications are hereby expressly claimed in accordance with 35 U.S.C. §§119, 120, 365 and 371 and any other applicable statutes.

FIELD OF THE INVENTION

The present invention relates generally to keyword criteria searching on streaming data, and more particularly to a method for private keyword searching on streaming data such that the searching does not reveal what keywords are being searched for and does not reveal whether any such keywords have been located or whether the corresponding documents have been retained. A primary use of the invention is in tracking terrorist-related activity on the Internet, without the potential terrorists knowing what is being tracked, but the invention may be used for other privacy-preserving data-mining applications as well.

BACKGROUND OF THE INVENTION

Many applications require collection and searching of large amounts of data. A timely example (though not the only one) is that the intelligence community is interested in collecting relevant information from vast amounts of streaming data, such as packet traffic on network routers, on-line news feeds, on-line chat rooms, message boards, on-line search requests, and potentially terrorist-related websites. With such vast amounts of data, it is virtually impossible to store it all. Therefore, typically the streaming data is filtered from multiple data streams using search criteria in an online environment, wherein most of the data is filtered out as irrelevant, leaving a much smaller amount of relevant data to be processed. The relevant data is retained based on the search criteria that have identified the data as potentially relevant. The relevant data is then transferred to a classified/secured environment for private analysis. However, this method cannot necessarily keep the search criteria private/classified.

Preferably the search criteria is classified, because otherwise adversaries could simply avoid using terms within the search criteria, and thus prevent their communications from being identified and analyzed. Therefore, another current practice is to collect all streaming data at issue into a secured environment, and then filter out the unwanted/irrelevant data within the secured environment, leaving the relevant data for further analysis within the secured environment. However, this approach is extremely burdensome in terms of the time and storage required, and further involves a risk that the data transfer of such a vast amount of data into the secured environment will be interrupted, causing further delay and potentially even data loss or data corruption.

Therefore, it is desirable for a method that allows searching and filtering of streaming data in a non-secured and/or distributed environment, in such a manner that the search criteria as well as the results of the searching and filtering remain classified (i.e., hidden even from the person who's machine may be executing a program embodying the invention), even when the relevant data is transferred from the non-secured environment to the secured environment. Such a method would be particularly useful if capable of being executed in a distributed environment, because the searching and filtering could then be outsourced publicly to multiple, even non-trusted computers and locations, resulting in virtually limitless resources. The method would be further desirable if it could be implemented with a computer program having a size independent of the data stream size.

SUMMARY OF THE INVENTION

The present invention allows searching and filtering of streaming data in a distributed, non-secured environment, in such a manner that the search criteria as well as the results of the searching and filtering remain private, even when relevant data is transferred from the non-secured environment to a secured environment. Several methods are used to provably ensure to a high and acceptable degree of certainty that all relevant documents are "retained," and all irrelevant documents are "discarded." The proofs are set forth in the '602 Provisional Application, and/or are otherwise known or capable of determination by those of ordinary skill in the art. We describe how, given a secret criteria, we create a program consisting of a Pubic-Key Encryption and an initial encrypted buffer. Given the Public-key and the encrypted buffer, any collection of documents, one at a time, can be written into the buffer using the Public-Key (such that only documents satisfying the secret criteria are retained).

Then, given the buffer and the secret key (for the aforementioned Public-Key encryption), the totality of matching documents can be recovered precisely, provided that the total size of matching documents written to the buffer (or a specific linear function of this size) does not exceed the allotted buffer space. The program size is usually proportional to the dictionary size, but we have one construction wherein the program size is even smaller than the dictionary size. In either case, the program size does not depend on the data stream size.

The method is accomplished by taking advantage of the properties of homomorphic probabilistic encryption schemes, as explained more fully herein. Such schemes are well-known. Briefly, a homomorphic encryption scheme has the property that the encryption of plain-text x plus the encryption of plain-text y is equal to the encryption of (x+y). In other words, the encryption map preserves some algebraic structure of the plain-text set in the cipher-text set. This idea can be written as $E(x)+E(y)=E(x+y)$, but since modern cryptosystems are probabilistic, the precise relation is actually expressed as $D(E(x)+E(y))=x+y$, where D represents the Decryption function. The above example illustrates an additively homomorphic cryptosystem. We say a cryptosystem is additively homomorphic if the plain-text set is an additive group of integers, even if the cipher-text set is not. For example, even though the cipher-text set in the well-known Pallier cryptosystem is a multiplicative group of integers, the system uses multiplication of cipher-texts to reflect addition of plain-texts. So since the plain-text set is an additive group of integers, we say the Pallier cryptosystem is additively homomorphic.

Not all homomorphic cryptosystems are additively homomorphic. That is, the operator on the plain-text set in the above equation is not necessarily an addition operator for all homomorphic encryption systems. It could be any abstract algebraic operation, and so the equation is written in a more general sense as $D(E(x)\ op1\ E(y))=x\ op2\ y$, where op1 and op2 are the respective algebraic operators. In other words, the encryption scheme has associated therewith a first operation and a second operation such that when the first operation is performed on an encryption of a first plain-text and an encryption of a second plain-text to produce a first result, and the second operation is performed on the first plain-text and the second plain-text to produce a second result, a decryption of the first result yields a value equal to the second result. Furthermore, as is the case with the Pallier cryptosystem, the operation (op2) on the plain-text set need not be the same as the operation (op1) on the cipher-text set. However, we use addition (as in the example above) throughout this application for clarity and simplicity in our exposition.

A probabilistic encryption scheme is one such that there are many different ways to encrypt a single plain-text value. We refer to a Chosen Plaintext Attack-secure ("CPA-secure") encryption scheme as a probabilistic scheme such that for any two plain-texts (of equal size), encryptions of the first are indistinguishable from encryptions of the second to an adversary without the private key, even if many encryptions of the two plain-texts are already known to the adversary. For example, in such a scheme, an encryption of the number 0, represented herein by $E(0)$, and an encryption of the number 1, represented herein by $E(1)$, are virtually impossible for an adversary to tell apart from each other without the private key, even if many cipher-texts other than the given cipher-texts are known by the adversary to be an $E(0)$ or an $E(1)$ respectively. The Pallier cryptosystem is CPA-secure under a standard computational assumption, and our preferred method of implementation of our invention is to use the Pallier cryptosystem.

A general and perhaps slightly abstract view of the invention is that the invention applies to streaming data containing discrete tokens from a set of known tokens where the tokens are stored in a data source that can be searched. For simplicity, the invention is described in terms of documents (discrete portions of the streaming data) containing words (the tokens) from a language (the set of known tokens), where the words are stored in a dictionary (the data source that can be searched). Each document has a unique number associated with it, calculated based on its actual contents, and in general we represent that value of a document as DOC, and the value of a specific document X as $DOC_x$. This concept is well-known and achievable using various publicly available algorithms. In the case of most text-based documents, the numeric value of a document will simply be its binary representation as a string of ASCII characters. Practically, the present invention is expected to be used on electronic data, and all such data has an internal numeric representation (usually in binary) on the machine(s) where the data exists. So any electronic document has such a value, and we use DOC to refer to the value. DOC may also conceptually be visualized simply as the document itself, instead of as a value of the document.

The present invention uses a dictionary containing all of the words (or a desired subset) in the language at issue. The dictionary is provided by a source from the secured environment (hereafter referred to as a "private source" or a "classified source"). We refer to a private source that has access to the decryption key as a key-holder. We refer to anyone else as an adversary. Each word in the dictionary has associated therewith a corresponding cipher-text, which is either an $E(0)$ or an $E(1)$. The words of interest (i.e., relevant words) have an $E(1)$ associated with them, while the words not of interest (i.e., irrelevant words) have an $E(0)$ associated with them. Each $E(0)$ in the dictionary is unique as compared to all other $E(0)$'s in the dictionary, and each $E(1)$ in the dictionary is unique as compared to all other $E(1)$'s in the dictionary.

As a document is received, the document is parsed such that each word in the document is looked up in the dictionary. If the document has keywords matching the search criteria, then an encryption of the document itself is produced. Otherwise, an encryption of the identity element is produced. But the adversary cannot know whether the document has the matching keyword criteria, because both matching and non-matching documents are processed in exactly the same manner. It is simply the values of the cipher-texts which control whether the encryption created is that of the document itself or that of the identity element. In both cases, the resulting encryption is written to a buffer for later decryption as further described herein. "Written" in this sense refers to mixing the resulting encryption into the buffer with whatever contents are already there, and in the case of our primary example this means adding encryptions.

The above process is repeated for each document, and at various times the buffer is sent to a secured environment for decryption and analysis. This process may occur at many nodes on a non-secured distributed network such as the Internet. As will be apparent, and as explained more fully herein, once the key-holder decrypts the buffers in the secured environment, the key-holder ends up with the relevant documents. Other considerations such as efficiency, overflow detection and handling, use of Boolean expressions in the search criteria, eliminating the probability of error using perfect hash functions, avoiding and detecting collisions in the buffer slots, and the actual decryption methods are discussed more fully herein and/or in the '602 Provisional Application.

Although the methods of the invention will be known by any adversary who can obtain a copy of a computer program implementing the present invention (or by any adversary who simply reads this patent application), we have proved as set forth in the '602 Provisional Application that such an adversary could still provably never reverse engineer the program to determine what the keyword search criteria are or what documents have been identified as containing the keyword search criteria or are saved in the buffer. This is true even if the adversary obtains a program embodying the invention and the buffer full of data (before it is sent to a secured environment and thus is still encrypted). So there is no risk of exposure even if such a computer program and the collected data fall into enemy hands.

The methods described above and to be described more fully herein, allow the searching and filtering to be performed publicly on a distributed network, without an adversary being able to determine what words are being searched for and what documents have been saved in a buffer as relevant. This is so because although the adversary might see the dictionary of words and corresponding cipher-texts, and therefore know that the subset of words being searched for is within the dictionary, there is no way for the adversary to determine which words have an $E(0)$ associated with them, and which words have an $E(1)$ associated with them, and hence no way for the adversary to know which words within the dictionary are being searched for. Furthermore, each document is written to the buffer either as an encryption of the document itself, or as an encryption of the identity element, but which of these two operations took place cannot be known to the adversary. So there is no way for the adversary to determine which documents have been saved as relevant, and which have not been.

Although the invention may be used to track terrorist-related activity on the Internet, such as by running on a search engine host to track IP addresses of computers that search for potentially terrorist-related information, the invention also has many other practical uses, because it may be used on any streaming data in an environment where it is desired to keep the search criteria and the search results private. One example is a company can perform an audit of its own data without massive data transfer and without having to take physical custody of its computers into an analytical environment. Another example is that using a list of names as a source of keywords, a private search of alias names can be performed without revealing the searcher's knowledge of the aliases. Medical records could be searched for certain conditions while maintaining patient privacy. Airline ticket data and other market-competitive consumer data could be compared by consumers without the sellers knowing the search criteria. Printer or fax documents could be keyword searched so that suspicious documents could "send an alarm" (i.e., notify the key-holder upon decryption). User on-line search requests through GOOGLE or other search sites could be tracked for criminal activity. These are just a few representative examples, and many other uses of the invention are possible, whenever the search criteria must remain hidden.

In one embodiment of the present invention, the method comprises: initializing an encryption variable to a value being an encryption of the identity element under a homomorphic and probabilistic CPA-secure encryption scheme; receiving a document comprising a plurality of document words; looking up each of the plurality of document words in a dictionary of known words, each of the known words being either a keyword or an irrelevant word, each of the irrelevant words having associated therewith a correspondingly unique cipher-text having a value that is an encryption of the identity element, and each of the keywords having associated therewith a correspondingly unique cipher-text having a value that is an encryption of a non-identity element; for each of the plurality of document words found during the lookup step, performing an operation associated with the encryption scheme on a first operand and a second operand, the first operand being the cipher-text corresponding to the found document word and the second operand being the encryption variable, each time changing the value of the encryption variable to be the result of the operation, so that the encryption variable ends with a final value; multiplying the final value of the encryption variable by the document to produce an encrypted document (or creating the encrypted document by bit-wise encrypting it using the final value of the encryption variable to represent 1, and the initial value of the encryption variable to represent 0); and writing the encrypted document to a first slot in a buffer comprising a plurality of slots, each having been initialized to contain an encryption of the identity element prior to the encrypted document being written. The above process could be repeated on each document in a stream of documents.

The encryption scheme could be additively homomorphic, in which case the identity element could be 0 and the non-identity element could be 1. The encryption scheme could be a public key encryption scheme, and could be the Pallier encryption scheme. After the document has been processed in this manner, it can be decrypted, ideally in a secured environment, and typically using an algebraic operation of the encryption scheme and a secret decryption key.

As part of the decryption, a value of the document is determined, and if the value is zero then the document is discarded, otherwise it is determined if the document is a collision of two or more documents, and if so then it is discarded, otherwise it is saved as a matching document. The encrypted document preferably is written to gamma slots in the buffer chosen randomly, gamma being an integer parameter chosen to produce an acceptable probability of data loss, which is exponentially small as a function of gamma. Also preferably, the document has a collision detection string associated with it (e.g., appended to it). Also preferably, each time the encrypted document (with its appended collision detection string) is written to one of the slots in the buffer, the encryption variable is written to the same slot. In one embodiment, the collision detection string consists of a series of k bits, partitioned into k/3 triples of bits, each triple consisting of a single bit randomly set to a 1 and the two other bits set to a 0 (or vice versa).

In another embodiment of the present invention, the encryption scheme is an additively homomorphic probabilistic CPA-secure encryption scheme. The Pallier encryption scheme is preferred. Each keyword in the dictionary has a corresponding cipher-text associated with it that has a correspondingly unique value that is an $E(1)$, and each of the irrelevant words has a corresponding cipher-text associated with it that has a correspondingly unique value that is an $E(0)$. Each slot in the buffer is initialized to an $E(0)$. A stream of documents is received (typically in a non-secured environment), and for each document, an $E(0)$ is assigned to the encryption variable. Then, each word in the document is looked up in the dictionary, and if the word is found, then its corresponding cipher-text is plus-equaled to the encryption variable. After all the words in the document have been processed in this manner, the final value (which we refer to as FV) of the encryption variable is "multiplied" by the document DOC to produce an encrypted document, which is then added to one of the slots in the buffer. Preferably, the encrypted document is added to gamma slots in the buffer chosen randomly, gamma being an integer parameter chosen to produce an acceptable probability of data loss that is exponentially small as a function of gamma.

Note that we do not assume a ring structure (i.e. an addition and multiplication operation) on the cipher-text set, or even that the cipher-text set consists of integers. That is, "multiplication" of FV by DOC is performed by adding FV to itself DOC times. This notion of "multiplication" is very well-known and is standard in modern algebra texts. This can be efficiently implemented provided only that the operation of the cipher-text set has an efficient implementation. In the preferred embodiment described herein, the multiplication can be accomplished by actual integer multiplication modulo a large number. In a preferred embodiment, the FV itself, is also stored in the slot with FV*DOC, and DOC has an additional variable appended thereto referred to as a collision detection string (discussed more fully herein).

When each document has a corresponding unique collision detection string appended to it, each encrypted document is actually an encryption of the document with its collision detection string appended to it. FV for each document is also written to each slot along with the encrypted document. A preferred embodiment of the collision detection string is that for each document, it consists of a correspondingly unique series of k bits, partitioned into k/3 triples of bits, and each triple of bits consists of a single bit randomly set to a 1 and the two other bits set to a 0 (or vice versa).

Once all of the documents have been processed, the buffer is sent to a secured environment for decryption using a secret decryption key. Preferably, each encrypted document has a corresponding size, and a linear function of a sum of the sizes of all of the encrypted documents that are not $E(0)$'s does not exceed an allocated buffer size.

DETAILED DESCRIPTION OF THE PREFERRED EMBODIMENTS

Figures 1, 3:
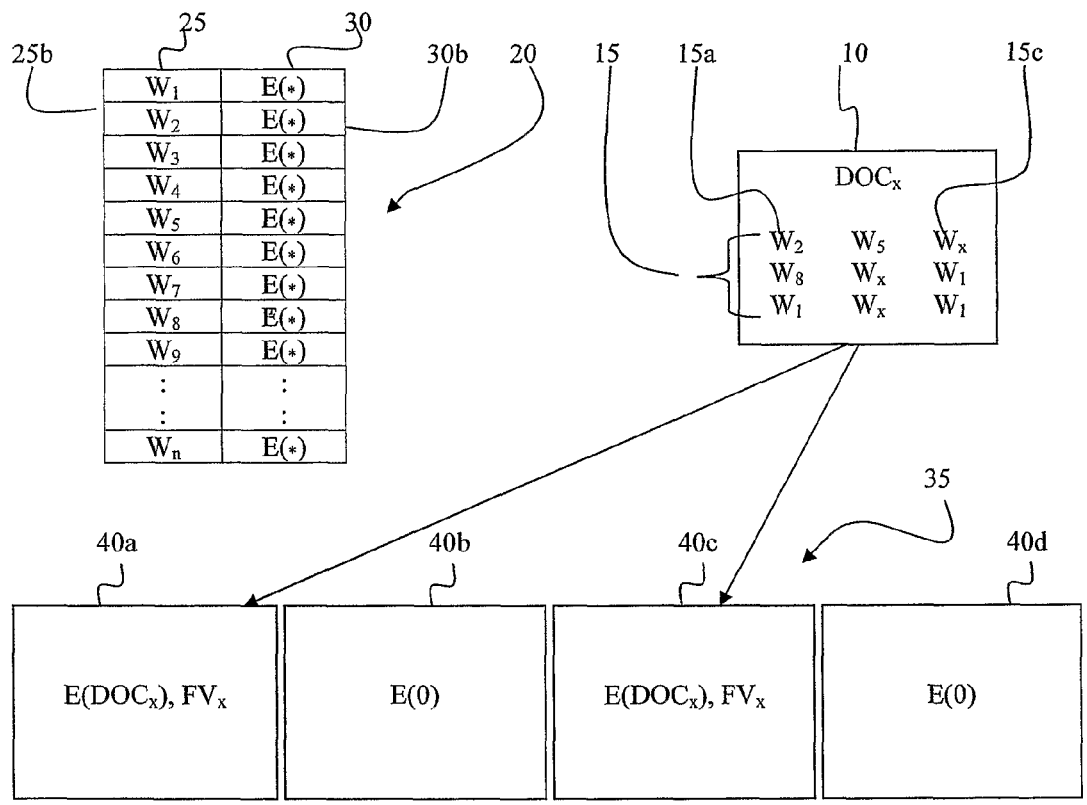
FIG. 1 is a diagram presenting a visualization of the primary data structures involved in carrying out the present invention, and the relationship between them, namely a document, the dictionary, and the buffer.
FIG. 3 illustrates collision detection strings in accordance with the present invention.

With the Background and Summary sections of the application in mind, the invention will now be described in detail, in association with the accompanying drawings. Turning to FIG. 1, a diagram is shown presenting a visualization of the primary data structures involved in carrying out the present invention, and the relationship between them. These are a document 10 having multiple words 15, a dictionary 20 containing words 25 and corresponding cipher-texts 30, and a buffer 35. FIG. 1 shows dictionary 20 as an array of ordered pairs, but this is not required. The specific data structure may be a data tree or other suitable structure. The specific cipher-text 30 associated with a particular word 25 is represented as E(*), to mean that the cipher-text is either an E(0) or an E(1), but nothing else. The dictionary 20 is created in a secured environment, so the creator can associate E(1)'s with the relevant words, and E(0)'s with the irrelevant words.

The example in FIG. 1 shows that $DOC_x$ 10 has words $W_1$ (3 times), $W_2$, $W_5$, and $W_8$. that are in the dictionary 20. $DOC_x$ 10 also has 3 words $W_x$ that are not in the dictionary. As will become apparent, it is not required that all words in the document 10 be in the dictionary 20. All that is required is that the relevant words are in the dictionary 20 and have an E(1) as their corresponding cipher-text 30. Once the method of the present invention is performed on $DOC_x$ 10 as described herein, $DOC_x$ 10 is encrypted and written to the buffer 35, preferably γ (gamma) times at random, along with a final calculated value ($FV_x$) for $DOC_x$ that is a final value of an encryption variable V as described herein. For simplicity, FIG. 1 shows this as $E(DOC_x)$, $FV_x$ being written to buffer 35 two times, to slots 40a and 40c of the buffer 35. $E(DOC_x)$ will be an E(0) if there were no hits, or an E(# of hits)*DOC if there were hits. This is explained more fully herein. The other slots 40b and 40d are shown as E(0)'s, because that's how they were initialized.

Figure 2:
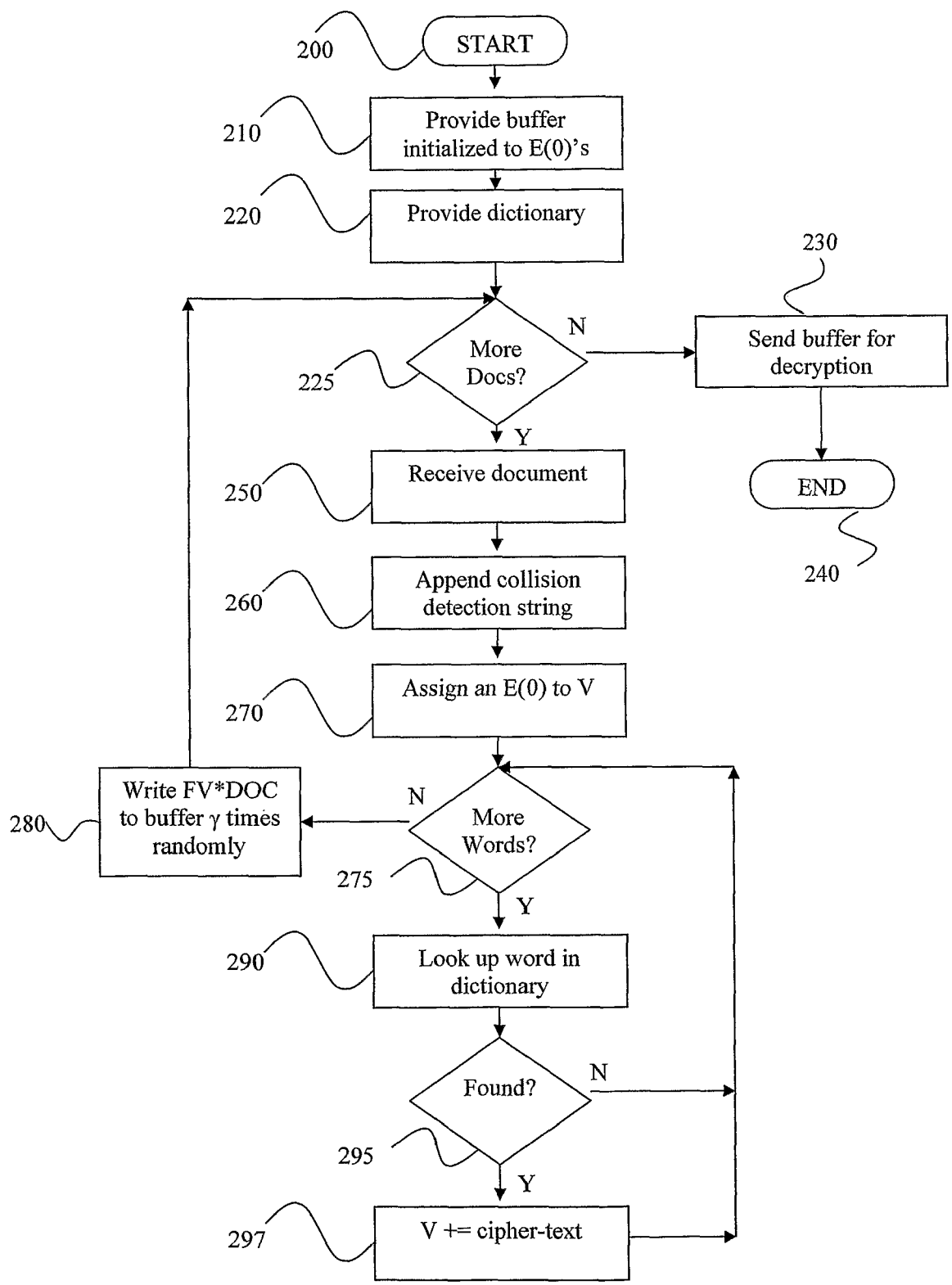
FIG. 2 is a flowchart showing a method of the present invention applied to a stream of multiple documents.
Figure 5:
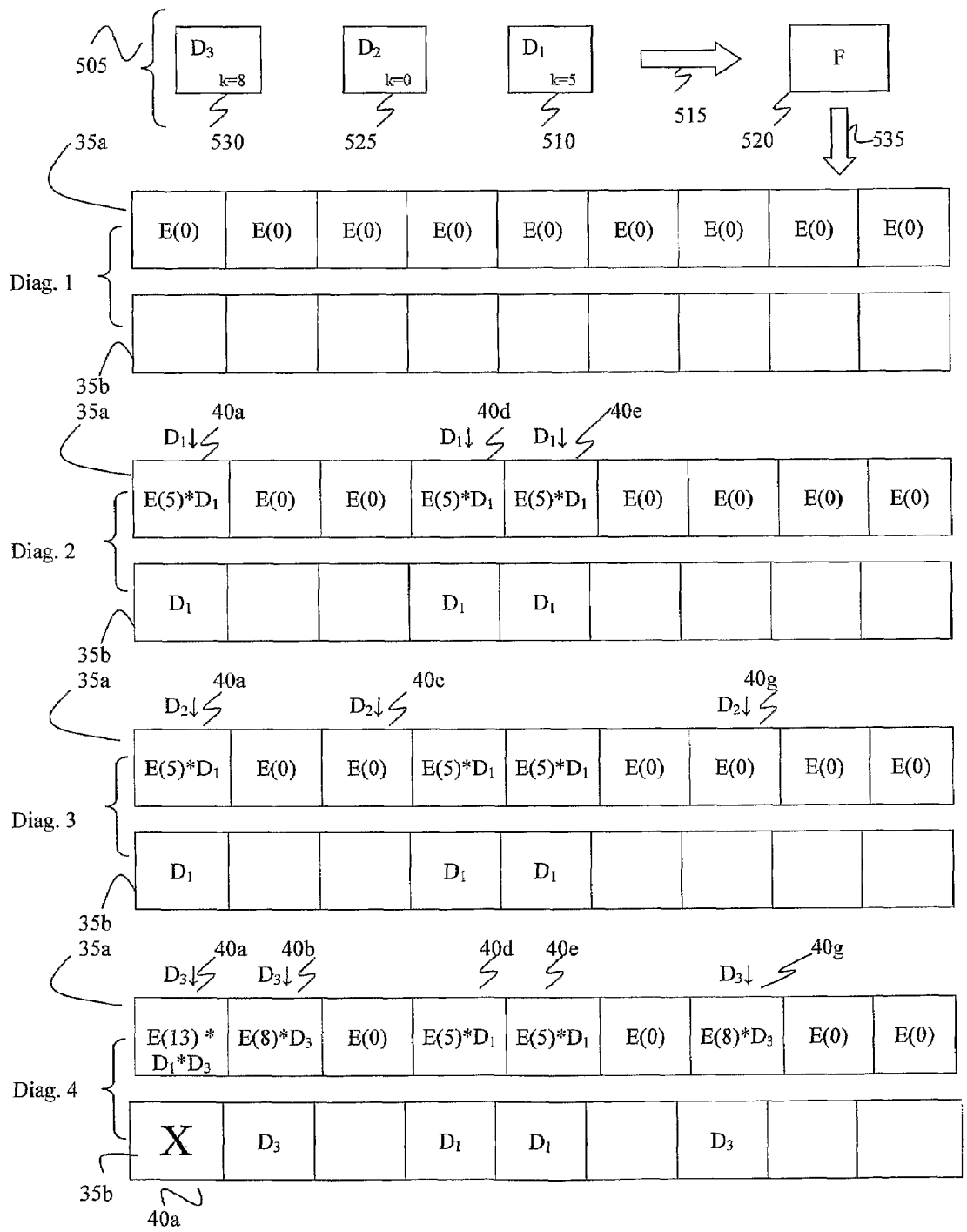
FIG. 5 illustrates how documents are stored in a buffer in accordance with the present invention, such that irrelevant documents do not affect the contents of the buffer.

Turning now to FIG. 2, a flowchart shows a method of privately searching for keyword criteria, applied to a stream of multiple documents. Concurrently, we will refer to FIG. 5 in appropriate steps to present a visualization of the method. FIG. 5 shows 4 diagrams (Diag. 1 through Diag. 4), each diagram being a pair of buffers 35a and 35b. Within each diagram, the buffer 35a and the buffer 35b represent the exact same buffer, but the upper representation 35a shows a visual representation of the encrypted content whereas the lower representation 35b shows a visual representation of what the decrypted content would be.

The process as shown in FIG. 2 begins at step 200. At step 210, a buffer 35 is provided having each slot 40 therein initialized to an E(0). "Providing" the buffer 35 refers simply to the buffer 35 being available in the described condition, whether it was created by the current user, obtained from an independent source, or simply is available for use to carry out the methods described herein. Typically, the buffer 35 will be initialized in a secured environment. FIG. 5, Diag. 1, shows the initialized buffer 35a as an E(0) in each slot 40 of buffer 35a, and as nothing in each slot of buffer 35b.

At step 220, the dictionary 20 is provided, in a format as described in connection with FIG. 1. "Providing" the dictionary 20 likewise refers simply to the dictionary 20 being available, whether it was created by the current user, obtained from an independent source, or simply is available for use to carry out the methods described herein. Typically, the dictionary 20 will be initialized in a secured environment. The dictionary 20 has words 25 each being either a keyword or an irrelevant word, and each of the keywords has its corresponding cipher-text 30 set to a correspondingly unique value that is an E(1) under an additively homomorphic probabilistic CPA-secure encryption scheme. Each of the irrelevant words has its corresponding cipher-text 30 set to a correspondingly unique value that is an E(0) under the encryption scheme. With the dictionary 20 available, and the buffer 35 initialized, the process of searching documents then begins.

At step 225, the question is asked as to whether there are anymore documents to be searched. This question seems necessary because the exact number of documents in the data stream 505 (FIG. 5) being searched is typically not known. If no more documents are in the data stream 505, then the process transfers to step 230, which is to transfer the buffer 35 to a secured environment for decryption of the encrypted documents, and the process then ends at step 240. Of course, this question would not be answered in the negative initially, unless no documents at all were searched, in which case the buffer would be sent back in its initialized state and then decrypted to the contents shown in diagram 1 of FIG. 5, i.e., nothing. So presuming there are more documents in the data stream 505, the process would then transfer to step 250, where the next document in the stream 505 is received. In FIG. 5, the document is $D_1$ 510, and as shown by arrow 515 it will be received into filter program F 520 that will process the document in accordance with the present invention, ultimately writing the document to the buffer as seen by arrow 535. Document $D_1$ 510 is shown with the notation k=5 to indicate that it has 5 of the keywords being searched for. Of course, that is not known until the process is complete, but for illustration purposes, it is helpful to label it as such.

At step 260, a unique collision detection string 305 (FIG. 3) is appended to the document 10. This step is not required, but is preferred to allow for more accurate results, and is described in more detail herein. At step 270, a value that is an E(0) is assigned to an encryption variable which we call V. "Assigning" this E(0) value refers simply to the value being available, whether it was created by the current user, obtained from an independent source, or simply is available for use to carry out the methods described herein. The value will be provided by a key-holder in the case where the encryption scheme is not a public key system, or it may be created by the user himself in the case where the encryption scheme is public key. In either case it is no problem that an adversary knows the specific value is indeed an E(0). In fact, with multiple users across a distributed network, the key-holder may provide the exact same E(0) to them all, or different E(0)'s. It makes no difference. All that matters is that it is an E(0).

Now that the document 10 has been received, it is parsed to look up all of its words 15 to see if they meet the keyword criteria. This begins at step 275, where it is asked whether any more words 15 exist in the document 10. This question seems necessary because the exact number of words 15 in the document 10 are typically not known. If no more words 15 are in the document 10, then the process transfers to step 280, which is to write FV*DOC to the buffer 35, and the process then returns to step 225 to check for more documents. The writing step is described more fully herein. Of course, here too, this question would not be answered in the negative initially, unless no words 15 were in the document 10, in which case the FV*DOC would be an E(0), decrypted to a 0 which is interpreted as irrelevant.

So presuming there are more words 15 in the document 10, the process would then transfer to step 290, where the next word 15 is looked up in the dictionary 20. This step presumes that the "words" are discrete recognizable tokens within the "language" at issue. For example, most human languages include a space delimiter in their written form. For some languages, however, the "words" may not include simple delimiters. In such cases, the invention still works, and simply must implement the set of rules for parsing the given language. Using the example shown in FIG. 1, and presuming we are on the word 15c labeled $W_x$, then the lookup would fail (because $W_x$ is not in the dictionary), the query at step 295 would be answered in the negative, and so the process would return to step 275 to check for the next word 15. In that case, effectively the word 15c is simply ignored. Optionally, an E(0) could be added to V in this instance as well. This represents the adversary's limited knowledge stemming from the fact that the dictionary 20 is public, and so the adversary can always know that the words being searched for are in the dictionary. Practically, this is not a concern because the dictionary will be relatively large. If, on the other hand, we were on the word 15a labeled $W_2$, the lookup would yield a match for word 25b. Thus, the query at step 295 would be answered in the affirmative, and so the process would continue to step 297.

At step 297, the cipher-text 30 that is an E(*) corresponding to the word 25b found in the dictionary 20, is plus-equaled to V. Plus-equaling is taking the contents of the second operand (here the E(*)), adding it to the first operand (here V), and storing the result in the first operand (here V). This phrase is common in C++ programming and would be expressed in C++ as V+=E(*). The process then returns to step 275 to check for the next word 15. As can be seen in FIG. 2, the process loops until there are no more words 15, and each time a successful lookup occurs, the value of V is changed by plus-equaling the corresponding E(*) to V. After all words 15 have been looked up, the process then transfers to step 280, and the value of V is now the final value which we refer to as FV. At step 280, FV*DOC is calculated to produce an encrypted document which is then written to the buffer. The writing step preferably also writes the actual value $FV_x$ to each slot in which $DOC_x$ is written, as shown in FIG. 1, so that the encrypted document ($FV_x$*$DOC_x$) could then be decrypted (with the secret key) by dividing by $FV_x$ to result in $DOC_x$.

In a preferred embodiment, as will be the case for many cryptosystems, the process of adding an element to itself some integral number of times as in the formula "FV*DOC" is always invertible. However, this is not the case in general. For example, it may be that 2*X=Y always has a plurality of solutions for a single, fixed value Y. In such a case, we must revert to a more primitive form for creating potential encryptions of a document, such as using the value FV to create a "bit-wise encryption" of DOC. That is, encrypt DOC one bit at a time, using FV to encrypt a 1, and using our initial encryption of 0 (E(0)) for the 0 bits. Furthermore, if the order of our non-identity element (which we have labeled 1) is small (less than the number of keywords), we randomize and repeat the process of selecting FV to ensure correctness. However, this process will demand much more storage than our preferred embodiment, and as such is not explained in great detail here, although it is thoroughly described in IACR Cryptology ePrint Archive Report 2005/242 http://eprint.iacr.org/2005/242, which is hereby incorporated herein by reference.

Based on the homomorphic encryption scheme, and the design of the dictionary, the encrypted document (FV*DOC) will be either an E(0) (if no keywords were found in the document), or E(x)*DOC, where x is the number of keywords that were found in the document. Referring to FIG. 5, this is shown in diagram 2 which shows $D_1$ 510 being written to buffer 35a as E(5)*$D_1$, because $D_1$ 510 had 5 keywords as indicated by k=5 in $D_1$ 510. Note that the corresponding slots 40a, 40d, and 40e in buffer 35b in diagram 2 show simply $D_1$, because that is what would exist in those slots upon decryption.

FIG. 5 shows $D_1$ being written to 3 separate slots 40a, 40d, 40e of buffer 35. This represents $D_1$ 510 being written to γ (gamma) slots 40 in the buffer 35, the slots 40 chosen randomly, gamma being an integer parameter (which we refer to as a correctness parameter) chosen to produce an acceptable probability of data loss which is exponentially small as a function of gamma. The details of how to choose gamma are explained in the '602 Provisional Application, but suffice it to say that we increase the probability of a matching document surviving (i.e., being in at least 1 slot with no other matching documents) by adding the document to gamma slots 40 in the buffer 35 randomly, and preferably we make the buffer size (i.e., the number of slots) proportional to 2*gamma*m, where m is the upper bound of the number of documents 10 we wish to store. So we may choose gamma based on m and the percent of correctness we desire. Each slot 40 of the buffer 35 is preferably of size c, where c is the size of each document to be stored in the buffer 35. This description presumes that documents of size less than c will be padded, and documents of size greater than c will be truncated. However, larger documents could also be broken up into sub-documents, and then FV could be multiplied by each of the sub-documents and stored into the buffer in contiguous slots. The basic format of the buffer would remain the same, except the contiguous slots in this case would be considered a single slot for certain processing.

We can guarantee that if there is a matching document that survives, then it can be recovered during the decryption of the buffer 35. For best guarantees, the randomness should be "true" randomness. Sources could be mouse movement, random keystrokes, a Geiger counter, or any other suitable source of randomness. Also, pseudo-random functions could be applied to the collected randomness to produce very large strings of random data, thereby reducing the amount of randomness that needs to be collected from the user or other source.

The above process continues for each document in the data stream 505, as shown by the transfer of control from step 280 back to step 225. Continuing with the example shown in FIG. 5, we have thus far processed only document $D_1$ 510 having 5 keywords, and thus the buffer (35a, 35b) has contents as shown in Diag. 2. The next document in the stream 505 is document $D_2$ 525 having 0 keywords, as indicated by the k=0 in document $D_2$ 525. Thus, after document $D_2$ 525 is processed, at step 280 the value of FV would be an E(0), and the value of the encrypted document FV*DOC would therefore also be an E(0). Based on the homomorphic encryption scheme, when document $D_2$ 525 is written to the gamma random slots (slots 40a, 40c, and 40g as seen in Diag. 3 in FIG. 5), the slots are unaffected as to their decryptions. That is, although the buffer contents are re-written (i.e. re-encrypted) their decryption contents do not change. This is because based on the homomorphic scheme, adding E(0)'s into the buffer has the effect of adding 0's to the plain-text. Thus, as seen in Diag. 3, slot 40*a* still has an E(5)*$D_1$, (i.e. the encrypted $D_1$) which would decrypt to $D_1$, and slots 40*c* and 40*g*, which were E(0)'s from initialization, will still be E(0)'s and thus will decrypt to 0 (an indication of no document being there).

Now, continuing still with the example shown in FIG. 5, we have thus far processed documents $D_1$ 510 having 5 keywords, and $D_2$ 525 having zero keywords, and thus the buffer (35*a*, 35*b*) has contents as shown in Diag. 3. The next document in the stream 505 is document $D_3$ 530 having 8 keywords, as indicated by the k=8 in document $D_3$ 530. Thus, after document $D_3$ 530 is processed, at step 280 the value of FV would be an E(8), and the value of FV*DOC would therefore be E(8)*$D_3$. Based on the homomorphic encryption scheme, when document $D_3$ 530 is written to the gamma random slots (slots 40*a*, 40*b*, and 40*g* as seen in Diag. 4 in FIG. 5), the previous E(0) slots (40*b* and 40*g*) become E(8) *$D_3$, which decrypt to $D_3$, and slot 40*a* becomes an E(13) *$D_1$*$D_3$, which is indicated in slot 40*a* of buffer 35*b* as "X" to represent that a collision has occurred (and would be detected as described herein), so the "document" in slot 40*a* would be disregarded. Thus, as seen in Diag. 4, slots 40*d* and 40*e* would be decrypted to $D_1$, and slots 40*b* and 40*g* would be decrypted to $D_3$, both $D_1$ and $D_3$ having thus survived.

When there are no more documents, the query at step 225 is answered in the negative, and so control passes to step 230 at which time the buffer is sent to a secured environment for decryption. The process then ends at step 240. Of course, a new data stream 505 may then be processed, and the process would begin all over at step 200. The entire process, as described herein, may be performed by multiple public sources on multiple data streams, each source then transferring its buffer of data to the secured environment for decryption upon completion of processing the data stream. It should be noted that the query at step 225 may also be arbitrary in that the process can instead stop after a certain number of documents have been processed, or after a certain amount of time has elapsed, or based on some other condition, so long as the condition is not based on the contents of the documents.

Significantly, an examination of FIG. 2 reveals that the only decisions involve whether there are any more documents (step 225), whether there are any more words within a document (step 275), or whether a word is found in the dictionary (step 295). No decisions are made based on the value of the words in the dictionary. In other words, all of the other steps in the process appear as, and indeed are implemented as "straight-line" code. This is what we mean when we say that the process cannot be reverse engineered by an adversary to determine what data is being searched for, or what the results of the search are.

Figure 4:
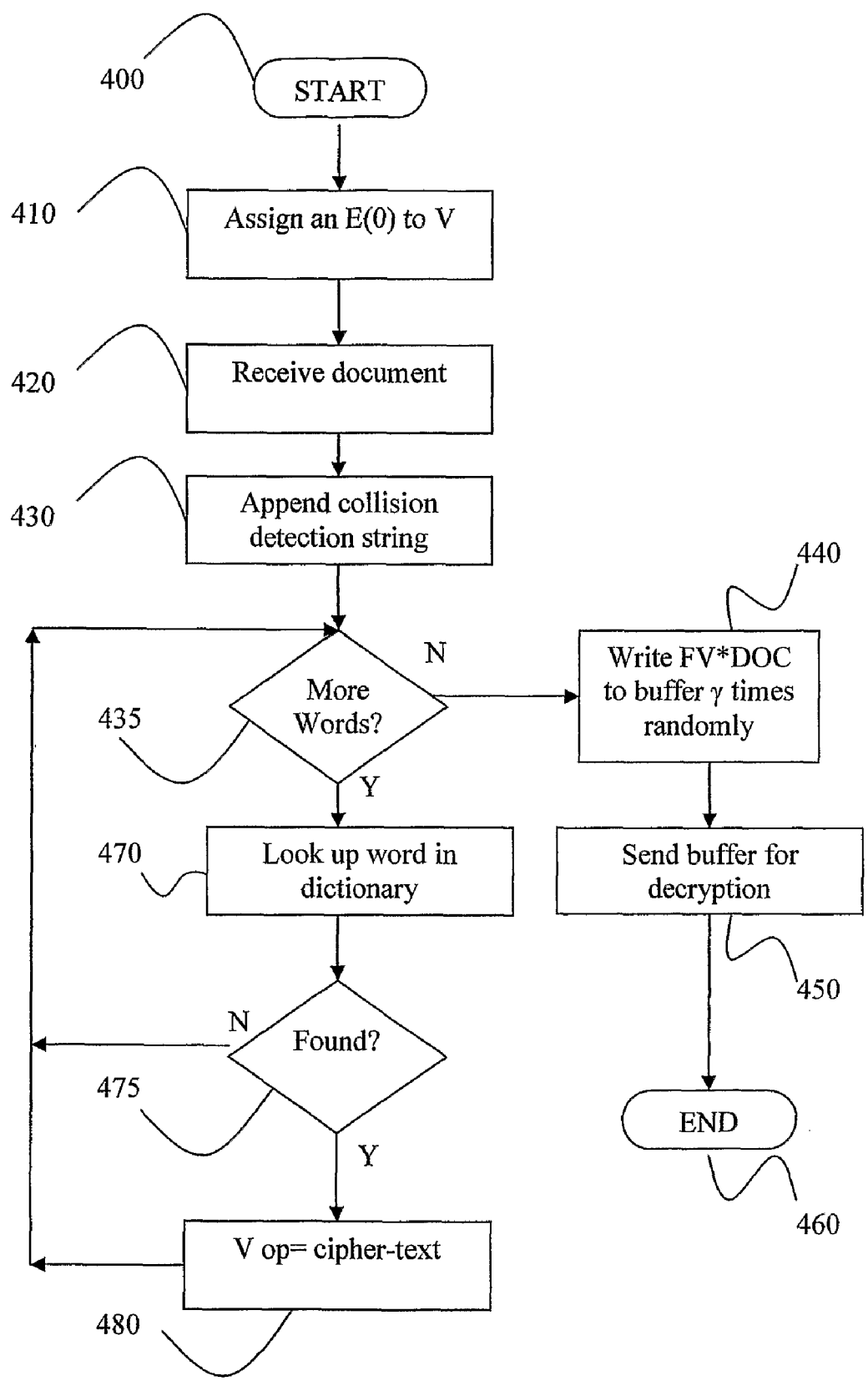
FIG. 4 is a flowchart showing a method of the present invention applied to a single document.

Turning now to FIG. 4, a flowchart illustrates a method of the present invention applied to a single document. Much of the discussion with respect to FIG. 2 applies here as well, and will not be repeated. The method begins at step 400. At step 410, the encryption variable V is initialized to a value being an encryption of an identity element under a homomorphic and probabilistic CPA-secure encryption scheme (which we will still represent here by E(0), even though the number 0 might not be the identity element). Here, "initializing" refers simply to V being set to E(0), whether it was done so by the current user, an independent source, or in some other manner. The process then proceeds to step 420, where a document comprising a plurality of words is received. At step 430, a unique collision detection string is appended to the document. This step is not required, but is preferred to allow for more accurate results, and is described in more detail herein, Now that the document has been received, it is parsed to look up all of its words to see if they meet the keyword criteria. This begins at step 435, where it is asked whether any more words exist in the document. If no more words are in the document, then the process transfers to step 440 where FV*DOC is written to the buffer, and then at step 450 the buffer is sent to a secured environment for decryption. The process then ends at step 460. Of course, presuming a stream of data, a new document may then be processed, and the process would begin all over at step 410. The entire process, as described herein, may be performed by multiple public sources on multiple data streams, each source then transferring its buffer of data to the secured environment for decryption upon completion of processing the data stream.

So presuming there are more words in the document, the process would then transfer to step 470, where the next word is looked up in the dictionary of known words. As previously explained, each of the known words is either a keyword or an irrelevant word, and each of the irrelevant words has associated therewith a correspondingly unique cipher-text having a value that is an E(0), while each of the keywords has associated therewith a correspondingly unique cipher-text having a value that is an E(1). Here, remember that we are using E(0) to represent the identity element, even if the identity element is not actually the number 0. Likewise, we are using E(1) to represent a non-identity element, even if the non-identity element is not actually the number 1.

After the word is looked up at step 470, the question is asked at step 475 if the word was found in the dictionary. If not, then the word is effectively ignored, as shown by the process returning to step 435 to process the next word. If, however, the word is found, then the process proceeds to step 480, where the cipher-text corresponding to the found word is the op-equaled to V. Here, op-equaled is used to represent a general operation (op) associated with the encryption scheme, as supposed to a specific operation such as addition in which case the function would be referred to as plus-equaled. After the op-equaling of the cipher-text to V, the process returns to step 435 to look up the next word. The lookup process (steps 470, 475, and if applicable 480) continues for each word in the document, such that each time step 480 is executed the value of V changes, ending in a final value we have called FV.

When there are no more words, the process transfers to step 440 where the final value of the encryption variable (FV) is multiplied by the document (DOC) to produce an encrypted document (FV*DOC) which is then written to the buffer, all slots in the buffer having been already initialized to E(0) before the write operation. Alternatively at step 440, the encrypted document could be created by bit-wise encrypting DOC using FV to represent 1 and the initial value of V to represent 0. Preferably, DOC is written to γ (gamma) random slots in the buffer, gamma being an integer parameter (the correctness parameter) chosen to produce an acceptable probability of data loss which is exponentially small as a function of gamma. Here too, preferably the actual value FV is written to each slot in which DOC is written, so that the encrypted document (FV*DOC) could then be decrypted (with the secret key) by dividing by FV to result in DOC.

At step 450 the buffer is then sent to a secured environment for decryption. Of course, in a stream of documents, the process could be repeated by transferring control from step 440 to step 410. But FIG. 4 was intended to illustrate the process on just a single document, for simplification. The process then ends at step 460.

We will now turn to a discussion of the collision detection string 305 (FIG. 3), and how it is used during decryption to determine if a buffer slot has a legitimate matching document as opposed to garbage caused by a collision of documents. Recall that collisions are possible, and in fact likely, based on the writing steps which write each DOC to gamma random buffer slots. However, as proved in the '602 Provisional Application, despite such collisions, the methods of the present invention still yield acceptable results in terms of the probability that all matching documents will survive.

In our preferred embodiment, the collision detection string 305 consists of a series of k bits, partitioned into k/3 triples of bits, each triple of bits consisting of a single bit randomly set to a 1 and the two other bits set to a 0 (or vice versa, which would yield the equivalent result). Here, k obviously is an integer divisible by 3. Recall that each DOC has a unique collision detection string 305 appended to it. Thus, in the embodiments using collision detection strings 305, when we refer to DOC being written to the buffer this also includes the collision detection string for that DOC. In FIG. 1, for example, where slot 40a shows $E(DOC_x), FV_x$, the $DOC_x$ includes the collision detection string 305.

When the buffer is decrypted, (e.g., one document at a time), if a decrypted value of the document is zero then the document is not a matching document (because FV*DOC will be an $E(0)$). If the decrypted value of the document is not zero, then it is either a good document or it is a collision. A non-zero document is good if exactly 1 bit in each of the k/3 triples of bits is a 1. Otherwise, a collision has occurred. The reason for this is because if two documents are written on top of each other in a slot, then their corresponding collision detection strings will be combined, resulting in a new bit-string that has an extremely low probability of remaining in the format of the original collision detection strings (i.e., a single bit in each triple set to a 1 and the two other bits set to a 0). For example, FIG. 3 shows three separate collision detection strings 305a, 305b, and 305c, representing the collision detection strings of three separate documents written to the same slot. The resulting collision detection string 310 would exist upon decryption. It can be seen that the length of the collision detection string 305 can be set to exponentially decrease the odds of failing to detect a collision. As the length is increased, the odds of failing to detect a collision are exponentially decreased.

In some instances, the key-holder likely would be able to detect a collision without using the collision detection string, because adding binary representations of documents would look like garbage, and be unrecognizable. This would be the case, for example, if the document were in the English language. However, even in such a case it is desirable to have the collision detection strings because the collisions could be identified and discarded automatically without requiring human intervention. So while using the collision detection strings mathematically proves a very strong sense of correctness, it also is a convenience for the key-holder.

We will now briefly discuss the concept of overflow detection. Overflow detection and handling is discussed more fully in the '602 Provisional Application. Overflow is a condition in which too many matching documents have been written to the buffer, so that the probability of all matching documents surviving is not acceptable. We can calculate an overflow detection value based on a known size of the buffer and an upper bound on the number of matching documents written to the buffer. One such upper bound can be computed by storing the sum of all the final values of encryption variables, which will be an encryption of the total number of keywords found in the stream. If the calculated upper bound of matching documents exceeds the buffer's designed capacity, then overflow is possible. If an accurate estimate for the average number of keywords per matching document is available, then a more accurate detection value can be calculated. In the example above, the computed upper bound can be divided by the average number of keywords per matching document to predict overflow if that number exceeds the designed buffer capacity.

If the condition of overflow is determined, then this could be acted upon dynamically to make decisions such as sending the buffer for decryption, or stopping receipt of the streaming data. However, this is potentially risky in that doing so might reveal information about the keywords and/or the number of matching documents. Overflow can also be detected during decryption based on the number of collisions.

One additional concept is that we can extend our query types using the BGN cryptosystem, which is homomorphic over polynomials of total degree two. That is, the encryption scheme allows computing polynomials of total degree two on cipher-texts. The basic methods remain the same, but there is an additional operation performed to obtain FV. Instead of only a single encryption variable (V), two Vs are used. Also, two sets of cipher-texts are associated with the dictionary, one set to be used with the first V, and the other set to be used with the second V. The second set of cipher-texts still has $E(0)$'s for irrelevant words, and $E(1)$'s for keywords. In this method, each of the two Vs is initialized to $E(0)$, and if a word is found in the dictionary, then one corresponding cipher-text is op-equaled to the first V, and the other is op-equaled to the second V. When the two FV's are determined, they are combined to produce an encryption of the first FV multiplied by the second FV using a means provided by the encryption scheme (e.g., the bilinear map of the BGN scheme) to produce one new FV, used as described previously to encrypt DOC. This is described more fully in the '602 Provisional application.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims. As an example, though the methods have been shown and described using a specific sequence of steps, it should be apparent to those of ordinary skill in the art that the specific sequences are not necessarily required. One specific example is that appending the collision detection string to a document and assigning an $E(0)$ to V are not sequence dependent on each other, and thus either can be performed before or after the other.

What is claimed is:

1. A method of privately searching for keyword criteria in an electronic document, the method comprising:
   a) initializing an encryption variable to a value being an encryption of an identity element under a homomorphic and probabilistic Chosen Plaintext Attack-secure (CPA-secure) encryption scheme;
   b) receiving an electronic document comprising a plurality of document words;
   c) looking up each of the plurality of document words in a dictionary of known words, each of the known words being either a keyword or an irrelevant word, each of the irrelevant words having associated therewith a correspondingly unique cipher-text having a value that is an encryption of the identity element under the encryption scheme, and each of the keywords having associated therewith a correspondingly unique cipher-text having a value that is an encryption of a non-identity element under the encryption scheme;

d) for each of the plurality of document words found during the lookup step, performing an operation associated with the encryption scheme on a first operand and a second operand, the first operand being the cipher-text corresponding to the found document word and the second operand being the encryption variable, each time changing the value of the encryption variable to be the result of the operation, the encryption variable ending with a final value;

e) encrypting the electronic document using the encryption variable;

f) writing the encrypted electronic document to a first slot in a buffer comprising a plurality of slots, each of the plurality of slots having been initialized to contain an encryption of the identity element prior to the encrypted electronic document being written to the first slot.

2. The method of claim 1, wherein the encryption scheme is additively homomorphic, and the identity element is 0 and the non-identity element is 1.

3. The method of claim 1, wherein the encryption scheme comprises a Pallier encryption scheme or a public key encryption scheme.

4. The method of claim 1, further comprising sending the buffer to a secured environment for decrypting the encrypted electronic document.

5. The method of claim 1, wherein if a decrypted value of the electronic document is zero then the electronic document is not a matching document, and if the decrypted value of the electronic document is not zero and is not a collision of two or more electronic documents, then the decrypted value of the electronic document is the electronic document.

6. The method of claim 1, further comprising writing the encrypted electronic document to gamma slots in the buffer chosen randomly, wherein gamma is an integer parameter chosen to produce an acceptable probability of data loss, and said probability is exponentially small as a function of gamma.

7. The method of claim 6, wherein the electronic document has associated therewith a collision detection string, and wherein each time the encrypted electronic document is written to one of the plurality of slots in the buffer, the encryption variable is written to the same slot and the collision detection string is written to the same slot.

8. The method of claim 7, wherein the collision detection string consists of a series of k bits, partitioned into k/3 triples of bits, each triple of bits consisting of a single bit randomly set to a 1 and the two other bits set to a 0.

9. The method of claim 1 further comprising repeating steps a) through f) for each of a plurality of electronic documents received in a stream of electronic documents.

10. The method of claim 1, wherein encrypting the electronic document comprises bit-wise encrypting the document using the final value of the encryption variable to represent the non-identity element and using the initial value of the encryption variable to represent the identity element.

11. A method of privately searching for keyword criteria on streaming data, the method comprising:

providing a dictionary of words each being either a keyword or an irrelevant word, each of the keywords having associated therewith a corresponding cipher-text having a correspondingly unique value that is an encryption of the number one under an additively homomorphic probabilistic Chosen Plaintext Attack-secure (CPA-secure) encryption scheme, and each of the irrelevant words having associated therewith a corresponding cipher-text having a correspondingly unique value that is an encryption of the number zero under the encryption scheme;

providing a buffer with each slot therein initialized to contain an encryption of the number zero;

receiving a plurality of electronic documents each comprising a plurality of words;

for each of the plurality of electronic documents, performing the following:

a) assign an initial value that is an encryption of the number zero to an encryption variable;

b) look up each of the plurality of words in the dictionary;

c) for each of the plurality of words found in the dictionary, plus-equal the corresponding cipher-text to the encryption variable;

d) after sub-step c), encrypt the electronic document using the encryption variable;

e) add the encrypted electronic document to one of the slots in the buffer.

12. The method of claim 11, wherein sub-step e) further comprises adding the encrypted electronic document to gamma slots in the buffer chosen randomly, wherein gamma is an integer parameter chosen to produce an acceptable probability of data loss, and the probability is exponentially small as a function of gamma.

13. The method of claim 12, further comprising appending a correspondingly unique collision detection string to each of the plurality of electronic documents, and wherein each time one of the encrypted electronic documents including its corresponding collision detection string is added to one of the slots in the buffer, the encryption variable is written to the same slot.

14. The method of claim 13, wherein each of the collision detection strings consists of a unique corresponding series of k bits, partitioned into k/3 triples of bits, and each triple of bits in each of the collision detection strings consists of a single bit randomly set to a 1 and the two other bits set to a 0.

15. The method of claim 13, further comprising sending the buffer to a secured environment for decrypting.

16. The method of claim 15, wherein the plurality of electronic documents are received as streaming data in a non-secured environment, and the decryption is performed in a secured environment using a secret decryption key.

17. The method of claim 15, wherein each of the collision detection strings consists of a series of k bits, partitioned into k/3 triples of bits, each triple of bits consisting of a single bit randomly set to a 1 and the two other bits set to a 0.

18. The method of claim 11, wherein encrypting the electronic document comprises multiplying the encryption variable by the electronic document to produce the encrypted electronic document.

19. The method of claim 11, wherein the encryption scheme allows computing polynomials of total degree two on cipher-texts, each of the keywords has associated therewith a second corresponding cipher-text having a correspondingly unique value that is an encryption of the number one, and each of the irrelevant words has associated therewith a second corresponding cipher-text having a correspondingly unique value that is an encryption of the number zero, step a) further comprises assigning a value that is an encryption of the number zero to a second encryption variable, step c) further comprises plus-equaling the second corresponding cipher-text to the second encryption variable; and step d) further comprises combining the second encryption variable with the encryption variable to produce an encryption of their product using a means provided by the encryption scheme, and storing the result in the encryption variable before multiplying the encryption variable by the electronic document to produce the encrypted electronic document.

* * * * *